United States Patent [19]

Moedritzer

[11] 4,221,874
[45] Sep. 9, 1980

[54] PHOSPHOLANE OXIDE CONTAINING POLYMERS

[75] Inventor: Kurt Moedritzer, Webster Groves, Mo.

[73] Assignee: Monsanto Company, St. Louis, Mo.

[21] Appl. No.: 913,723

[22] Filed: Jun. 7, 1978

Related U.S. Application Data

[63] Continuation-in-part of Ser. No. 752,041, Dec. 20, 1976, abandoned.

[51] Int. Cl.$^2$ .................. C08K 5/53; C08G 18/14
[52] U.S. Cl. .................. 521/108; 260/45.7 P; 260/45.75 V; 260/45.75 W; 525/2; 521/906
[58] Field of Search .................. 521/107, 108, 906; 260/45.8 R, 936, 45.7 P

[56] References Cited

U.S. PATENT DOCUMENTS

| | | | |
|---|---|---|---|
| 2,520,090 | 8/1950 | Barrett | 260/930 |
| 2,561,493 | 7/1951 | Caprio et al. | 106/177 |
| 2,953,591 | 9/1960 | Garner | 260/936 |
| 3,041,293 | 6/1962 | Polacek | 521/107 |
| 3,121,106 | 2/1964 | Nagy | 260/928 |
| 3,157,613 | 11/1964 | Anderson et al. | 521/107 |
| 3,159,591 | 12/1964 | Lanham | 521/107 |
| 3,226,368 | 12/1965 | Reischl et al. | 528/51 |
| 3,250,827 | 5/1966 | Schroll | 260/961 |
| 3,706,821 | 12/1972 | Anderson et al. | 260/951 |
| 3,803,225 | 4/1974 | Smith et al. | 260/45.7 P |
| 3,812,219 | 5/1974 | Clovis et al. | 260/936 |
| 3,872,053 | 3/1975 | Fath et al. | 521/107 |
| 4,113,669 | 9/1978 | Zondler et al. | 260/45.8 R |
| 4,162,276 | 7/1979 | Rim et al. | 260/45.7 P |

OTHER PUBLICATIONS

Hilado, "Flammability Handbook for Plastics," 1969, pp. 82–86.

*Primary Examiner*—Hosea E. Taylor
*Assistant Examiner*—R. A. White
*Attorney, Agent, or Firm*—Scott J. Meyer; James W. Williams, Jr.

[57] ABSTRACT

The present invention relates to a process for the improvement of the flame retardant properties of a polymer composition which comprises incorporating therein an effective flame retardant amount of a halogenated phospholane oxide. The resultant products are useful as rigid or flexible foams and shaped articles having greatly improved flame retardant and smoke suppressant properties. The use of the halogenated phospholane oxide also imparts stability to the products, thus overcoming difficulties encountered with volatile phosphorus compounds which had been used heretofore with polymeric compositions such as polyurethanes.

10 Claims, No Drawings

PHOSPHOLANE OXIDE CONTAINING POLYMERS

RELATED APPLICATION

This is a continuation-in-part of copending application Ser. No. 752,041, filed Dec. 20, 1976 now abandoned.

BACKGROUND OF THE INVENTION

Various phosphorus compounds have been used as flame retardants with polymers such as polyurethanes. However, phosphorus compounds such as inorganic metal salts have been found difficult to apply or to retain in the polymer because of water solubility. Many of the organic phosphorus compounds are also volatile so that volatilization and exuding or bleeding of the compounds from the polymer occurs.

Another problem has been the formation of smoke since some phosphorus-organic compounds may reduce flammability, but cause considerable smoke evolution.

All organic based materials will burn, given proper conditions or proportions of heat and air. In recent years, plastic materials have found increasing use and many such materials pose a potential of fire wherever they are used.

Since polymers are organic materials, it would be impossible to make them non-combustible in all situations. Many additives and modifiers have been used to decrease the rate of burning and the spread of flame; however, most of the additives and modifiers so used are organic materials themselves which will burn under proper conditions. Many inorganic materials have also been used as flame retardants, but they are effective only when used in large amounts which are detrimental to polymer properties. Accordingly, known flame retardant additives, whether organic or inorganic, can be used in only small amounts or the physical properties of the polymer will be adversely affected.

The main cause of fire as a cause of death has been overlooked in the quest for better flame retardants. The problem of deaths caused by smoke inhalation remains.

It is not surprising that smoke reduction technology has not kept pace with flame reduction technology since it has seemed apparent to those skilled in the art that a system for reducing both smoke and flame would not be feasible. It was heretofore believed that smoke propagation was due to incomplete oxidation of the volatile products of pyrolysis and that smoke reduction could be achieved only by more complete oxidation, which inherently meant more flame. Conversely, increased smoke propagation was believed to be the natural and immutable consequence of flame reduction (i.e., reduced combustion).

Accordingly, there is a great need for polymer materials having reduced smoking characteristics, which are flame retardant, and which contain smoke and flame controlling additives in amounts insufficient to adversely affect the physical properties of the polymer.

SUMMARY OF THE INVENTION

The invention is based upon the combination of an organic polymer or resin together with an effective flame retardant amount of a halogenated phospholane oxide having the formula

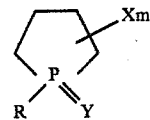

where
X is chlorine or bromine;
m is a number from 2 to 4;
Y is oxygen or sulfur; and
R is an alkyl, aryl, alkoxy or aroxy group of 1 to 10 carbon atoms (the alkyl and aryl compounds are preferred). Polymeric phospholane oxides may also be used. These R groups are illustrated by alkyls such as, e.g., methyl, ethyl, propyl, butyl, hexyl, octyl; aryl groups such as, e.g., phenyl, tolyl, xylyl, naphthyl; alkoxy groups such as, e.g., methoxy, ethoxy, butoxy; aroxy groups such as, e.g., phenoxy, naphthoxy; and similar such radicals having from 1 to 10 carbon atoms.

The brominated phospholane oxides are made by conventional methods such as described in U.S. Pat. No. 2,663,739, from $PCl_3$ or $RPCl_2$ reacted with a diolefinic compound, followed by halogenation. Representative compounds are the chlorinated and brominated derivatives of 1-phenylphospholane-1-oxide and 1-ethyl-3-methyl-phospholane-1-oxide, and 1-phenoxyphospholane-1-oxide, and 1-ethoxyphospholane-1-oxide.

DETAILED DESCRIPTION OF THE INVENTION

The objectives of this invention are accomplished by providing combinations of organic polymers with the above halogenated phospholane oxides. The latter compounds may be incorporated into the components of the polymer such as in the manufacture of polyurethanes, or may be added from solution or by direct addition of the compounds per se to the organic polymer. In general, an effective flame retardant amount of the additive ranges from greater than 5% up to 50% by wt., based upon the weight of the final modified polymer.

The properties of a flame retardant component and those of a modified polymer containing such a substance are measured by a number of test methods. The "oxygen index" reflects data obtained in accordance with ASTM D2863-70 and is defined as the minimum concentration oxygen, expressed as volume percent, in a mixture of oxygen and nitrogen that will just support combustion under the conditions of the test procedure. The greater the oxygen index, the better the flame retardancy.

The NBS (Nat'l Bur. Standards) Smoke Density Chamber Test covers a procedure for measuring the smoke generated by solid materials. Measurement is made of the attenuation of a light beam by suspended particulate matter generated from materials under flaming combustion within a closed chamber. The resulting measurement is expressed in terms of the maximum specific optical density of the smoke (i.e. $D_m$).

Results of the test are given as a numerical value of $D_m{}^f$ (flaming mode) and the time period in which $D_m$ occurs. The duration of the test is twenty minutes, or until $D_m$ is reached, whichever occurs first.

The relative efficiency of materials as smoke retardants is signified by a lower $D_m$ value over the duration of the test.

A detailed description of the test is given in the publication of the American Society of Testing Materials, ASTM STP No. 442 (1967).

The following examples illustrate specific embodiments of the invention, but are not limitative of the scope of the invention.

EXAMPLE 1

A polyurethane composition is prepared having the following formulation.

| Component | Parts by Weight |
| --- | --- |
| Sucrose-based polyol, hydroxyl no. = 470 (Multranol 4034, Mobay Chemical Co.) | 50 |
| Blowing Agent (H$_2$O) | 15.5 |
| n-Ethyl morpholine catalyst (Witco Chemical Company) | 1.5 |
| Silicone (DC 193, Dow Corning Company) | 0.8 |
| Polymethylene polyphenyl isocyanate, NCO eq. wt. = 131 (Mondur MR, Mobay Chemical Co.) | 70 |
| 1-methyl-3,4-dibromo-phospholane-1-oxide as the flame retardant | 10 |

The above formulation is used to prepare a modified polyurethane by heating. The polymer is employed in a smoke suppression test utilizing the procedure described above. The $D_m f$ is 98/2 min. The present phospholane oxide is also used in another polyurethane in an oxygen indext test with Estane, thermopolymeric polyurethane (B. F. Goodrich Company) as the substrate and with 10 wt. % of the phospholane oxide compound present. The oxygen index value is 25.3. Some scorching of the polymeric product occurs during the test. Similar flame and smoke results are obtained when the 1-methyl-2,3-dibromo phospholane-1-oxide additive is used.

EXAMPLE 2

A modified polyurethane is made using the following formulation:

| Component | Parts by Weight |
| --- | --- |
| Sucrose-based polyol, hydroxyl no. = 470 (Multranol 4034, Mobay Chemical Co.) | 50 |
| Blowing agent (H$_2$O) | 15.5 |
| n-Ethyl morpholine catalyst (Witco Chemical Company) | 1.5 |
| Silicone (DC 193, Dow Corning Company) | 0.8 |
| Polymethylene polyphenyl isocyanate, NCO eq. wt. = 131 (Mondur MR, Mobay Chemical Co.) | 70 |
| 1-phenyl-2,3- dibromo-phospholane-1-oxide as the flame retardant | 10 |

The above formulation is used to prepare a modified polyurethane by heating. The polymer is employed in a smoke suppression test utilizing the procedure described above. The $D_m f$ is 80/4 min. The present phospholane oxide is also used in another polyurethane in an oxygen index test with Estane, thermopolymeric polyurethane (B. F. Goodrich Company) as the substrate and with 10 wt. % of the phospholane oxide compound present. The oxygen index value is 23.7. Some scorching of the polymeric product occurs during the test. Similar flame and smoke results are obtained when the 1-phenyl-3,4-dibromo-phospholane-1-oxide is used as the additive.

EXAMPLE 3

A polyurethane is prepared utilizing the following components.

| Component | Parts by Weight |
| --- | --- |
| Polyether polyol (Pluracol GP-3030, Wyandotte Chemical Company) | 100 |
| Blowing agent (H$_2$O) | 4 |
| Triethylene diamine (Houbrey Chemical Company) | 0.65 |
| Silicone (L-520, Carbide Chemical Company) | 1 |
| Lead stearate | 4 |
| Stannous octoate catalyst | 0.16 |
| Tolylene diisocyanate | 54 |
| 1-phenoxy-2,3-dibromo-phospholane-1-oxide as the flame retardant | 10 |

The above polyurethane resulting from the heating of the components set forth above is subjected to a smoke test. The $D_m f$ is 211/3 min. When the above phospholane oxide is used in an oxygen index test with a substrate of Estane (a thermo-polymeric polyurethane of B. F. Goodrich Company) the oxygen index value at 10 wt. % is 23.7.

When the above test is conducted with an 3,4-dibromo compound similar flame retardant properties are obtained.

In addition to above brominated phospholane oxides, the use of the chlorinated phospholane oxides also gives flame retardant properties with polymers, for example, in the use of the 1-butyl-2,3-dichloro-phospholane-1-oxide or the corresponding butoxy compound. The corresponding brominated compounds when used with an epoxy resin substrate such as Epi-Rez 510 made by Celanese Chemical Company, also improve the flame retardant properties.

Further halogenation is also effective as in 1-ethyl-2,3-,4,5-tetrabromo-phospholane-1-oxide, used as the additive in polymer modification.

EXAMPLE 4

Two polyurethane compositions (A and B) are prepared with the following components:

| Component | Parts By Weight A | B |
| --- | --- | --- |
| 1-phenyl-2,3-dichloro-phospholane-1-oxide as the flame retardant | 20 | 20 |
| Sucrose-based polyol, hydroxyl no. = 470 (Multranol 4034, Mobay Chemical Co.) | 100 | |
| Amine based polyether polyol, hydroxy no. = 530, ave. M.W. = 480 (Poly-G-71-530, Olin Chemicals) | | 100 |
| Blowing agent (1 pt. H$_2$O, 30 pts. trichloromonofluoro-methane) | 31 | |
| Blowing agent (Trichloromonofluoro-methane) | | 48 |
| Amine catalyst, blend of triethylene-diamine (20%) and dimethylethanol-amine (80%) Dabco R-8020, Air Products) | 3 | |
| Dibutyltin dilaurate catalyst (Thermolite 12, M&T Chemicals) | | 0.3 |
| Silicone (DC-193, Dow Corning) | 1.6 | 2 |
| Polymethylene polyphenyl isocyante, NCO eq. wt. = 131 (Mondur MR, Mobay Chemical Co.) | 140 | |
| Polymethylene polyphenyl isocyanate, | | |

-continued

| Component | Parts By Weight | |
|---|---|---|
| | A | B |
| NCO eq. wt. = 133.5 (PAPI 135, Upjohn Polymer Chemicals) | | 143 |

The above polyurethanes resulting from the heating of the components set forth above are subjected to smoke tests and oxygen index tests as in Example 3 with the following results:

| | Smoke Test $D_m f$ | Oxygen Index |
|---|---|---|
| Composition A | 74 | 23.2 |
| Composition B | 104 | 23.7 |

Similar flame and smoke results are obtained when the 1-phenyl-3,4-dichloro phospholane-1-oxide is used as the flame retardant additive.

Results comparable to the above are obtained when the halogenated phospholane oxides of the present invention are incorporated in other resin systems, for example, methylmethacrylate, melamine/formaldehyde, vinyl halides and the like as described hereinafter.

Fire retardants incorporated in flexible urethane foam are often so volatile as to be unusable in practical applications. However, the compound dibrominated methyl phospholane oxide renders the foam self-extinguishing with only a slight increase in volatility. Ethylene glycol polyphosphate while self-extinguishing, is more volatile than this compound.

As illustrated, the compounds of the present invention are useful as flame retardants for a wide variety of natural and synthetic polymer materials. The compounds may be used in concentrations ranging from greater than 5 percent by weight relative to the total composition up to about 50 weight percent or more depending on the particular use for which the polymer material is intended.

Synthetic polymer materials, i.e., those high molecular weight organic materials which are not found in nature, with which the compounds of the invention are advantageously employed may be either linear or cross-linked polymers and may be in the form of sheets, coatings, foams and the like. They may be either those which are produced by addition or condensation polymerization.

An important class of polymers which are beneficially flame retarded with the compounds of the invention are those obtained from a polymerizable monomer compound having ethylenic unsaturation. A particularly preferred class of polymers which are flame retarded consists of the polymerized vinyl and vinylidene compounds, i.e., those having the $CH_2=C<$ radical. Compounds having such a radical are, for example, the solid polymeric alkenes, such as polyethylene, polypropylene, polyisobutylene or ethylene/propylene copolymers; polymerized acrylyl and alkacrylyl compounds such as acrylic, fluoroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyanoethoxy)ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide; ethyl or butyl chloracrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene; polyvinyl alcohol; the vinyl carboxylates such as vinyl acetate, vinyl chloroacetate, vinyl propionate, and vinyl 2-ethylhexanoate; the N-vinyl imides such as N-vinyl phthalimide and N-vinyl succinimide; the N-vinyl lactams such as N-vinyl caprolactam and N-vinyl butyrolactam; vinyl aromatic hydrocarbon compounds such as styrene, alpha-methylstyrene, 2,4-dichlorostyrene, alpha- or beta-vinyl-naphthalene, divinyl benzene and vinyl fluorene; the vinyl ethers such as ethyl vinyl ether or isobutyl vinyl ether; vinyl-substituted heterocyclic compounds such as vinyl pyridine, vinyl pyrrolidone, vinylfuran or vinylthiophene; the vinyl or vinylidene ketones such as methyl vinyl ketone or isopropenyl ethyl ketone; vinylidene cyanide. Homopolymers of the above compounds or copolymers and terpolymers thereof are beneficially flame retarded by the compounds of the present invention. Examples of such copolymers or terpolymers are those obtained by polymerization of the following monomer mixtures; vinyl chloride/vinyl acetate, ethylene/vinyl chloride/vinyl acetate, ethylene/vinyl chloride, acrylonitrile/vinyl pyridine, styrene/methyl methacrylate, styrene/N-vinyl pyrrolidone, cyclohexyl methacrylate/vinyl chloroacetate, acrylonitrile/vinylidene cyanide, methyl methacrylate/vinyl acetate, ethyl acrylate/methacrylamide/ethyl chloroacrylate, vinyl chloride/vinylidene chloride/vinyl acetate.

Other polymers of compounds having the ethylenic group, $>C=C<$, are homopolymers, copolymers and terpolymers of the alpha-, beta-olefinic dicarboxylic acids, amides, nitriles and imides for example, methyl, butyl, 2-ethylhexyl or dodecyl fumarate or maleate; maleic, chloromaleic, citraconic or itaconic anhydride; fumaronitrile, dichlorofumaronitrile or citracononitrile; fumaramide, maleamide or N-phenyl maleamide. Examples of particularly useful polymers and terpolymers prepared from the alpha-, beta-olefinic dicarboxylic compounds are the copolymers of maleic anhydride and a vinyl compound such as ethylene, propylene, isobutylene, styrene, alpha methylstyrene, vinyl acetate, vinyl propionate, methyl isopropenyl ketone, isobutyl vinyl ether, the copolymers of dialkyl fumarate such as ethyl or butyl fumarate and vinyl compounds such as styrene, vinyl acetate, vinylidene chloride, ethyl methacrylate, acrylonitrile and the like.

The compounds of the invention act as flame retardants for the polymers and copolymers of unsaturated, cyclic esters of carbonic acid, for example, homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily flame retarded by the compounds of the invention are also the polyarylcarbonate polymers such as the linear polyarylcarbonates formed from diphenols or dihydroxy aromatic compounds including single and fused-ring nucleii with two hydroxy groups as well as monohydroxy-substituted aromatic residues jointly in pairs by various connecting linkages. Examples of the foregoing include dihydroxy benzenes, naphthalenes and the like, the dihydroxydiphenyl ethers, sulfones, alkanes, ketones and the like.

The compounds of the invention also act as flame retardants for polymers, copolymers or terpolymers of polymerizable compounds having a plurality of double bonds, for example, rubbery, conjugated diene polymerizates such as homopolymerized 3-butadiene, 2-chlorobutadiene or isoprene and linear copolymers or terpolymers such as butadiene/acrylonitrile, isobutylene/butadiene, butadiene/styrene; esters of saturated di- or poly-hydroxy compounds with olefinic carboxylic acids such as ethylene glycol dimethacrylate, treithylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinyl benzene, as well as the crosslinked polymeric materials such as methyl methacrylate/diallyl methacrylate copolymer or butadiene/styrene/divinyl benzene terpolymer.

The cellulose derivatives are flame retarded by the compounds of the present invention. For example, cellulose esters such as cellulose acetate, cellulose triacetate or cellulose butyrate, the cellulose ethers such as methyl or ethyl cellulose, cellulose nitrate, carboxymethyl cellulose, cellophane, rayon, regenerated rayon and the like may be flame retarded.

The compounds of the present invention are well suited for flame retarding liquid resin compositions of the polyester type, for example, the linear polyesters which are obtained by the reaction of one or more polyhydric alcohols with one or more alpha, beta-unsaturated polycarboxylic acids alone or in combination with one or more saturated polycarboxylic acid compounds, or the crosslinked polyester resins which are obtained by reacting a linear polyester with a compound containing a $CH_2=C<$ group.

The compounds of the present invention are compatible flame retardants for epoxy resins. Such resins are condensation products formed by the reaction of a polyhydroxy compound and epichlorohydrin, which condensation products are subsequently cured by the addition of crosslinking agents. The hydroxy compounds may be, for example, ethylene glycol, 4,4'-isopropylidenediphenol and similar materials. The crosslinking agent employed in the curing step may be a dicarboxylic compound such as phthalic anhydride or adipic acid, but is more generally a polyamine such as ethylene diamine, paraphenylamine diamine or diethylene triamine.

Polyurethanes are a class of polymer materials which are flame retarded by the compounds of the present invention. The polyurethanes, like the above-mentioned polyesters, are materials which are employed in structural applications, for example, as insulating foams, in the manufacture of textile fibers, as resin bases in the manufacture of curable coating compositions and as impregnating adhesives in the fabrication of laminates of wood and other fibrous materials. Essentially, the polyurethanes are condensation products of a diisocyanate and a compound having a molecular weight of at least 500 and preferably about 1500–5000 and at least two reactive hydrogen ions. The useful active-hydrogen containing compounds may be polyesters prepared from polycarboxylic acids and polyhydric alcohols, polyhydric polyalkylene ethers having at least two hydroxy groups, polythioether glycols, polyesteramides and similar materials.

The polyesters or polyester amides used for the production of the polyurethane may be branched and/or linear, for example, the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric or itaconic acids with polyalcohols such as ethylene glycol, diethylene glycol, pentaglycol, glycerol, sorbitol, triethanolamine and/or amino alcohols such as ethanolamine, 3-aminopropanol, and with mixtures of the above polyalcohols and amines.

The alkylene glycols and polyoxyalkylene or polythioalkylene glycols used in the production of polyurethanes may by ethylene glycol, propylene glycol, butylene glycol, diethylene glycol, triethylene glycol, polythioethylene glycol, dipropylene glycol and the like.

Generally, any of the polyesters, polyisocyanate-modified polyesters, polyester amides, polyisocyanate-modified polyester-amines, alkylene glycols, polyisocyanate-modified alkylene glycols, polyoxyalkylene glycols and polyisocyanate-modified polyoxyalkylene glycols having three reactive hydrogen atoms, three reactive carboxylic and/or especially hydroxyl groups may be employed in the production of polyurethanes. Moreover, any organic compound containing at least two radicals selected from the group consisting of hydroxy and carboxy groups may be employed.

The organic polyisocyanates useful for the production of polyurethanes include ethylene diisocyanate, ethylidene diisocyanate, propylene-1,2-diisocyanate, m-phenylene diisocyanate, 2,4-tolylene dioscyanate, triphenylmethane triisocyanate, or polyisocyanates in blocked or inactive form such as the bis-phenyl carbamates of tolylene diisocyanate and the like.

Phenolic resins are flame retarded by the compounds of the present invention, which compounds may be incorporated into the phenolic resin either by milling and molding applications or by addition to film-forming or impregnating and bonding solutions prior to casting. Phenolic resins with which the present compounds are employed are, for example, the phenol-aldehyde resins prepared from phenols such as phenol, cresol, xylenol, resorcinol, 4-butylphenol, cumylphenol, 4-phenylphenol, nonylphenol, and aldehydes such as formaldehyde, acetaldehyde or butyraldehyde in the presence of either acid or basic catalysts, depending upon whether the resin is intended for use as a molding or extruding resin or as the resin base in coating and impregnating compositions.

Aminoplasts are another group of aldehyde resins which are flame retarded by the compounds of the invention. Examples of aminoplasts are the heat-convertible condensation products of an aldehyde with urea, thiourea, guanidine, cyanamide, dicyandiamide, alkyl or aryl guanamides and the triazines such as melamine, 2-fluoro-4,6-diamino-1,3,5-triazine and the like. When the aminoplasts are to be used as impregnating agents, bonding adhesives, coating and in casting of films, the compounds of the present invention are incorporated into solutions or suspensions in which the aminoplast is carried. The resulting mixtures give strong, fire-retardant laminates when sheets of paper, glass, cloth or fabric are impregnated therewith and cured.

Another class of compounds which are flame retarded by compounds of the present invention are the nylons, for example, the superpolyamides which are generally obtained by the condensation of a diamine, for example, hexamethylene diamine with a dicarboxylic acid, for example, adipic acid.

Other polyamides which are flame retarded in accordance with the present invention are polypetides which may be prepared, for example, by reaction of N-carbobenzyl oxyglycine with glycine or mixture of glycine and lysine or an N-carboxy amino acid anhydride such as N-carboxy-DL-phenylalanine anhydride, piperidone, 2-oxohexamethyleneimine and other cyclic amides. The compounds of the present invention can be incorporated into molding or extruding compositions for a flame retarded effect.

The compounds of the present invention are also useful as flame retardants for linear polymers obtained by the self-condensation of bifunctional compounds, for example, the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutric acid; the polyamides which are prepared by the self-condensation of aminocarboxylic acids such as 4-aminobutyric acid; the polyanhydrides which are formed by the self-condensation of dicarboxylic acids such as sebacic or adipic acid.

The preferred synthetic polymer materials which are flame retarded by the compounds of the present invention are the vinyl halide polymers in the form of milled products, plastisols and foams, rigid and flexible polyurethane coatings and foams, epoxy resins, ABS and GRS rubbers, aminoplasts and phenolics. The vinyl halide polymers can be simple, mixed homopolymers of vinyl chloride or polyvinylidene chloride, or copolymers or terpolymers in which the essential polymeric structure of polyvinyl chloride is interspersed at intervals with residues of other ethylenically unsaturated compounds copolymerizable therewith. The essential properties of the polymeric structure of polyvinyl chloride is retained if not more than about 40 percent of a comonomer is copolymerized therewith. Especially preferred copolymers include ethylene/vinyl chloride and vinyl chloride/acrylonitrile copolymers. Especially preferred terpolymers include ethylene/vinyl chloride/acrylonitrile, ethylene/vinyl chloride/acrylic acid and ethylene/vinyl chloride/acrylamide terpolymers.

Natural polymeric materials which may be flame retarded by the compounds of the present invention include natural rubber, cellulose esters, for example, cellulose acetate and cellulose nitrate, ethyl cellulose, cork and wood flour products and similar cellulosic materials.

The polymer formulations which are flame retarded in accordance with the present invention, whether in sheet or film form or of foam or molded structure, may contain various conventional additives such as fillers, extenders crosslinking agents and colorants. Minor amounts of stabilizers, for example, are usually incorporated to reduce the effects of heat and light.

When foamable compositions are used, the composition may be a self-blowing polymer or the polymer may be blown by chemical or mechanical means or by the use of compressed gas. Fillers which are frequently employed to lower the cost of the finished material and to modify its properties include calcium carbonate and magnesium silicate. When fillers are employed, they are generally present in an amount of up to about 150 parts by weight of filler per 100 parts by weight of polymer formulation.

Where a colored or tinted composition is desired, colorants or color-pigments are incorporated in amounts of from about one to about five parts by weight to 100 parts by weight of polymer.

Surfactants such as silicones are normally added to foam formulations which are mechanically frothed. The surfactants reduce the surface tension of the foam and thereby increase the air or gas entrapment characteristics of the foam.

Additionally, glass-forming inorganic materials such as zinc borate, zinc oxide, lead oxide, lead silicate and silicon dioxide may be added to decrease the flame and smoke generating characteristics of the polymer.

While the invention has been described by referring to certain specific embodiments, it is not so limited since many modifications and variations are possible in the light of the above teachings. The invention may therefore be practiced otherwise than as specifically described without departing from the spirit and scope of the invention.

The embodiments in which an exclusive property or privilege is claimed are defined as follows:

1. A process for the improvement of the flame retardant properties of a polyurethane polymer composition which comprises incorporating therein an effective flame retardant amount ranging from greater than 5% up to about 50% by weight, based on the weight of the final modified polymer, of a compound of the formula

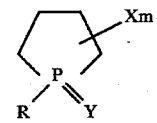

where
X is chlorine or bromine;
m is a number from 2 to 4;
Y is oxygen or sulfur; and
R is an alkyl, aryl, alkoxy or aryloxy group of 1 to 10 carbon atoms.

2. The process of claim 1 wherein said compound is 1-phenyl-3,4-dibromo phospholane-1-oxide.

3. The process of claim 1 wherein said compound is 1-phenyl-2,3-dibromo phospholane-1-oxide.

4. The process of claim 1 wherein said compound is 1-methyl-3,4-dibromo phospholane-1-oxide.

5. The process of claim 1 wherein said compound is 1-methyl-2,3-dibromo phospholane-1-oxide.

6. The process of claim 1 wherein said compound is 1-phenyl-2,3-dichloro phospholane-1-oxide.

7. The process of claim 1 wherein said compound is 1-methyl-3,4-dibromo phospholane-1-oxide and in which said compound is incorporated at a level of about 6% by weight in a polyurethane foam.

8. The process of claim 1 wherein said compound is 1-phenoxy-2,3-dibromo phospholane-1-oxide and in which said compound is incorporated at a level of about 6% by weight in a polyurethane foam.

9. The process of claim 1 wherein said compound is 1-phenyl-2,3-dichloro phospholane-1-oxide and in which said compound is incorporated at a level of about 7% by weight in a polyurethane foam.

10. The process of claim 1 in which the compound is selected from the group consisting of 1-alkyl-dihalo-phospholane-1-oxides and 1-aryl-dihalo-phospholane-1-oxides.

* * * * *